US012633558B2

(12) United States Patent (10) Patent No.: US 12,633,558 B2
Shapiro et al. (45) Date of Patent: May 19, 2026

(54) METHOD AND FUEL CELL POWER SYSTEM TO IDENTIFY AND COMPENSATE FOR FUEL COMPOSITION VARIATIONS IN A FUEL CELL STACK OR SYSTEM

(71) Applicant: GE VERNOVA INFRASTRUCTURE TECHNOLOGY LLC, Greenville, SC (US)

(72) Inventors: Andrew Philip Shapiro, Schenectady, NY (US); Irfan Saif Hussaini, Glenville, NY (US); Charles J. Vesely, Andover, MN (US); Yuetao Zhang, Rexford, NY (US)

(73) Assignee: GE VERNOVA INFRASTRUCTURE TECHNOLOGY LLC, Greenville, SC (US)

( * ) Notice: Subject to any disclaimer, the term of this patent is extended or adjusted under 35 U.S.C. 154(b) by 548 days.

(21) Appl. No.: 18/245,463

(22) PCT Filed: Sep. 24, 2021

(86) PCT No.: PCT/US2021/051884

§ 371 (c)(1),
(2) Date: Mar. 15, 2023

(87) PCT Pub. No.: WO2022/066995

PCT Pub. Date: Mar. 31, 2022

(65) Prior Publication Data

US 2023/0275246 A1     Aug. 31, 2023

Related U.S. Application Data

(60) Provisional application No. 63/083,520, filed on Sep. 25, 2020.

(51) Int. Cl.
H01M 8/04701 (2016.01)
H01M 8/0432 (2016.01)
(Continued)

(52) U.S. Cl.
CPC ..... H01M 8/0606 (2013.01); H01M 8/04716 (2013.01); H01M 8/04738 (2013.01); H01M 8/04992 (2013.01)

(58) Field of Classification Search
CPC ........... H01M 8/0606; H01M 8/04716; H01M 8/04738; H01M 8/04992; H01M 8/04373;
(Continued)

(56) References Cited

U.S. PATENT DOCUMENTS 7,862,948 B2    1/2011    Lienkamp et al.
2003/0031903 A1*    2/2003    Peschke .................. H01M 8/04
429/430
(Continued)

FOREIGN PATENT DOCUMENTS

WO        2013160520        10/2013

OTHER PUBLICATIONS

Mao et al.; Selection of optimal sensors for predicting performance of polymer electrolyte membrane fuel cell; Journal of Power Sources; 328 (2016); pp. 151-160. (Year: 2016).*
(Continued)

*Primary Examiner* — Christian Roldan
(74) *Attorney, Agent, or Firm* — Buckley, Maschoff & Talwalkar LLC

(57) ABSTRACT

A fuel cell power system and method for identifying and compensating for variations identified in a fuel composition of a fuel cell power system, comprising the fuel cell system components selected from the group consisting of a catalytic oxidizer, a reformer, an exhaust, a fuel cell stack or system, or a combination thereof; and a control device configured to control the fuel cell system components, wherein the control device comprises a computer algorithm to indirectly correlate measurements of the fuel cell system components to a difference in the fuel composition.

10 Claims, 3 Drawing Sheets

(51) Int. Cl.

| | |
|---|---|
| *H01M 8/04537* | (2016.01) |
| *H01M 8/04791* | (2016.01) |
| *H01M 8/04858* | (2016.01) |
| *H01M 8/04992* | (2016.01) |
| *H01M 8/0606* | (2016.01) |

(58) Field of Classification Search
CPC ......... H01M 8/04559; H01M 8/04708; H01M
8/0488; H01M 8/0435; H01M 8/04798;
H01M 8/0618; H01M 2008/1293; Y02E
60/50
See application file for complete search history.

(56) References Cited

U.S. PATENT DOCUMENTS

| | | | |
|---|---|---|---|
| 2003/0224231 A1 | 12/2003 | Penev | |
| 2004/0247954 A1 | 12/2004 | Ohler et al. | |
| 2009/0197129 A1* | 8/2009 | Shimoi ............. | H01M 8/04238 |
| | | | 429/429 |
| 2010/0173211 A1 | 7/2010 | Kim et al. | |
| 2015/0228990 A1* | 8/2015 | Ballantine ......... | H01M 8/04649 |
| | | | 429/430 |
| 2017/0179503 A1 | 6/2017 | Wang et al. | |
| 2018/0145351 A1 | 5/2018 | Wang et al. | |
| 2019/0305335 A1 | 10/2019 | Fisher et al. | |

OTHER PUBLICATIONS

PCT Search Report and Written Opinion prepared for PCT Application No. PCT/US2021/051884, completed Nov. 17, 2021.

* cited by examiner

Gen2-300c: EoL System Model

Gen2-300c: EoL System Model

Net efficiency: 0.4172
Net power: 14.64 kW

|       | F3    | F3a   | F4/F5 | F6    | F0    |
|-------|-------|-------|-------|-------|-------|
| H2O   | 0.428 | 0.428 | 0.315 | 0.493 | 0.000 |
| H2    | 0.132 | 0.112 | 0.268 | 0.152 | 0.000 |
| N2    | 0.000 | 0.000 | 0.000 | 0.000 | 0.000 |
| CO2   | 0.237 | 0.237 | 0.240 | 0.273 | 0.000 |
| CO    | 0.063 | 0.063 | 0.079 | 0.073 | 0.000 |
| CH4   | 0.120 | 0.160 | 0.098 | 0.009 | 0.850 |
| ETH   | 0.020 | 0.000 | 0.000 | 0.000 | 0.150 |

SUMMARY 18.082 Gross output (kW)
-0.682 Air blower
-0.450 AGR blower
-1.808 DC/DC, Inverter
-0.500 Aux. loads
14.642 Net output (kW)
35.093 Thermal input (kWt)
0.4172 Net efficiency

15% Ethane in Fuel With No Fueling Compensation

Gen2-300c: EoL System Model

Net efficiency: 0.4484
Net power: 14.15 kW

| | F3 | F3a | F4/F5 | F6 | F0 |
|---|---|---|---|---|---|
| H2O | 0.509 | 0.509 | 0.360 | 0.586 | 0.000 |
| H2 | 0.054 | 0.035 | 0.234 | 0.063 | 0.000 |
| N2 | 0.000 | 0.000 | 0.000 | 0.000 | 0.000 |
| CO2 | 0.255 | 0.255 | 0.264 | 0.293 | 0.000 |
| CO | 0.047 | 0.047 | 0.060 | 0.054 | 0.000 |
| CH4 | 0.116 | 0.155 | 0.082 | 0.005 | 0.850 |
| ETH | 0.020 | 0.000 | 0.000 | 0.000 | 0.150 |

SUMMARY 17.478 Gross output (kW)

-0.682 Air blower

-0.402 AGR blower

-1.748 DC/DC, Inverter

-0.500 Aux. loads 14.145 Net output (kW)

31.544 Thermal input (kWt)

0.4484 Net efficiency

15% Ethane in Fuel With Fueling Compensation

METHOD AND FUEL CELL POWER SYSTEM TO IDENTIFY AND COMPENSATE FOR FUEL COMPOSITION VARIATIONS IN A FUEL CELL STACK OR SYSTEM

CROSS-REFERENCE TO RELATED APPLICATIONS

This application is a national stage entry under 35 U.S.C. § 371 (b) of PCT International Application No. PCT/US2021/051884, filed Sep. 24, 2021, which claims priority to and the benefit under 35 USC § 119 (e) of U.S. Provisional Patent Application No. 63/083,520, filed on Sep. 25, 2020, the entire disclosures of all of which are incorporated herein by reference.

TECHNICAL FIELD

The subject matter described herein generally relates to a method and a fuel cell power system to identify and compensate for fuel composition variations in a fuel cell, a fuel cell stack, and/or a fuel cell system.

BACKGROUND

A fuel cell power system may comprise the fuel cell systems, fuel cell stacks, or fuel cells. Fuel cells may operate in stationary, semi-stationary, or portable applications. Certain fuel cells, such as solid oxide fuel cells (SOFCs), may operate in large-scale power systems that provide electricity to satisfy industrial, municipal needs, and heavy equipment. Other fuel cells, such as proton exchange membrane fuel cells (PEMFCs), is useful for smaller portable applications such as, for example, powering automobiles and vehicles (e.g., cars, boats, trains, etc.). In practice, fuel cells are typically amassed in electrical series in an assembly of fuel cells (e.g., a fuel cell stack) to produce power at useful voltages or currents to generate or support an external power application.

Fuel cell stacks and systems typically comprise a plurality of fuel cells. Fuel cells generate power based on an electrochemical reaction that occurs within or between the hydrogen in fuel at the anode of the fuel cell and the oxidant (e.g., oxygen) in air at the cathode of the fuel cell. As such, the composition of the fuel used in the fuel cell anode is extremely critical to optimize efficiency and performance of any fuel cell, fuel cell stack, or fuel cell system. More specifically, the amount, quantity, and difference of components in a fuel composition is critical to the efficacy and efficiency of the performance of a fuel cell, stack, or system.

Typical fuels (e.g., natural gas) comprise many different compositions, including but not limited to hydrogen, water vapor, carbon monoxide, methane, ethane, propane, nitrogen, and/or carbon dioxide. In particular, the amount of methane in a fuel, which is often converted to hydrogen to fuel a fuel cell, a fuel cell stack, and/or fuel cell system, is critical to produce optimal power generation by the fuel cell. Conversely, large concentrations of ethane in a fuel composition often causes suboptimal and/or poor performance of a fuel cell. As such, methane and ethane concentrations in a fuel composition are also critical to the performance and important to measure of a fuel in a fuel cell, stack, or system.

The composition and/or the amount of different components in a fuel composition (e.g., a wholesale fuel), such as methane or ethane, may vary significantly. While most current fuel control equipment and monitoring software assume that any fuel is comprised of a particular composition (for example, 100% methane and/or has a heating value of about 1000 British Thermal Units (BTUs) per cubic ft., fuel compositions may vary from about 80-100%, 81-100%, 82-100%, 83-100%, 84-100% and/or 85-100% methane and still perform even if less efficiently than high-methane fuels or if such operation causes degradation of the fuel cell or fuel cell system. More specifically, the composition and/or components of a fuel composition used in a fuel cell, stack, or system may depend on several factors, including, but not limited to: the fuel vendor or supplier, geographic location of the vendor (e.g., region to region), geographic origination of the fuel composition, the lot (e.g., lot to lot variation), time of year or order season (e.g., full, winter, summer, spring), etc.

In addition, the composition of a fuel for a fuel cell system may also vary over time. For example, a fuel composition can change or vary short time periods, such daily (e.g., within 24 hours), hourly, within minutes, or even within seconds or milliseconds, such as immediately or instantaneously. Ultimately, a fuel composition and/or a fuel feed stock (e.g., a renewable and/or biological material that can be converted into energy or fuel) can change at any time, such that a fuel composition is generally or often unknown and/or unpredictable. Importantly, if fuels are used or introduced into a fuel cell, a fuel cell stack, or fuel cell system that are comprised of a different composition than that for which the fuel cell, stack, or system is designed, calibrated, or used, the fuel cell, stack, or system may operate at suboptimal conditions and possibly suffer irreversible degradation or damage. Such damage is extremely costly, and therefore much easier to avoid, reduce, or prevent.

One way to measure or ascertain the composition or components of a fuel composition requires fuel metering with large equipment that is expensive, and thus cost prohibitive for regular monitoring use. More specifically, fuel monitoring or metering equipment, such as hotwire-type anemometers and gas analyzers, must directly measure, detect, and/or assess the composition of fuel for a fuel cell system. As a result, current fuel cells, stacks, and systems often suffer deterioration, degradation, and/or inefficiencies due to the cost, complexity, impracticality, and/or constraints to employ such fuel metering equipment in real industrial, transportation, or systems applications.

In addition, gas and fuel prices fluctuate on a daily basis, which readily effects the cost to provide high efficiency fuel (e.g., comprising high concentration of methane) to fuel cells. Importantly, less efficient fuels, such as those that have high concentrations of higher molecular weight hydrocarbons (e.g., propane and ethane), is costly and detrimental to fuel cell system components since the fuel cell system is calibrated for a standard fuel composition.

In light of the expensive and large equipment required to directly measure fuel composition variations and the reserved cost of providing high quality fuel that is optimally efficient, the present disclosure is directed to a method and system to practically and accurately determine, identify, and/or predict fuel cell composition variations in a fuel cell system so as to prevent, avoid, and/or reduce damage to a fuel cell, a fuel cell stack, or a fuel cell system. In addition and in response to any identified, determined, and/or predicted fuel composition variations, the present method and system provide compensation to the system and its fueling strategy, system, and components to optimize, maximize, and/or maintain efficient fuel cell (e.g., SOFC) performance. This compensation ability of the present method and system is particularly important and advantageous over the equipment currently in the art, particularly when the fuel cell power system is under conditions where a fuel composition has been identified to be variable, unstable, and/or unpredictable.

SUMMARY

The present disclosure is directed to a method for identifying variations in a fuel composition of a fuel cell power system. The method comprises measuring the fuel cell system parameters selected from the group consisting of a system voltage, a temperature of a catalytic oxidizer, a temperature of a reformer, and a temperature of an exhaust air. The method further comprises mathematically analyzing the measurements of the fuel cell system parameters. In addition, the present method comprises identifying a difference in the fuel composition of the fuel cell power system.

In an embodiment of the present method for identifying variations in a fuel composition of a fuel cell power system the measuring the fuel cell system parameters comprises a system voltage and a temperature of a catalytic oxidizer. In another embodiment of the present method for identifying variations in a fuel composition of a fuel cell power system the measuring the fuel cell system a system voltage and a temperature of a reformer. In a further embodiment of the present method for identifying variations in a fuel composition of a fuel cell power system the measuring the fuel cell system a system voltage and a temperature of an exhaust air. In yet another embodiment of the present method for identifying variations in a fuel composition, the system voltage, temperature of a catalytic oxidizer, temperature of a reformer, and temperature of the exhaust air are measured and/or increased, while the current of the fuel cell power system remains constant.

The present method of identifying variations in a fuel composition of a fuel cell power system is performed by a control device. In one embodiment of the present method, the mathematically analyzing the measurements of the fuel cell system parameters is performed by a computer algorithm of the control device.

The present disclosure is also directed to a method for compensating for variations identified in a fuel composition of a fuel cell power system. The method comprises measuring the fuel cell system parameters selected from the group consisting of a system voltage, a temperature of a catalytic oxidizer, a temperature of a reformer, and a temperature of an exhaust air. The method further comprises mathematically analyzing the measurements of the fuel cell system parameters. In addition, the present method comprises identifying a difference in the fuel composition of the fuel cell power system. Finally, this method comprises generating and transmitting a command or instruction from a control device to the components of the fuel cell power system.

In one embodiment of the present method for compensating for variations identified in a fuel composition of a fuel cell power system the measuring the fuel cell system comprises a system voltage and a temperature of a catalytic oxidizer. In another embodiment of the present method for compensating for variations identified in a fuel composition of a fuel cell power system the measuring the fuel cell system a system voltage and a temperature of a reformer. In a further embodiment of the present method for compensating for variations identified in a fuel composition of a fuel cell power system the measuring the fuel cell system a system voltage and a temperature of an exhaust air. In yet another embodiment of the present method compensating for variations identified in a fuel composition of a fuel cell power system, the system voltage, temperature of a catalytic oxidizer, temperature of a reformer, and temperature of the exhaust air are measured and/or increased, while the current of the fuel cell power system remains constant.

The present method of compensating for variations identified in a fuel composition of a fuel cell power system is performed by a control device. In one embodiment of the present method, the mathematically analyzing the measurements of the fuel cell system parameters is performed by a computer algorithm of the control device.

Finally, the present disclosure is directed to a fuel cell power system for identifying and compensating for variations identified in a fuel composition of a fuel cell power system. The present fuel cell power system comprises the fuel cell system components selected from the group consisting of a catalytic oxidizer, a reformer, an exhaust, a fuel cell stack or system. The fuel cell power system also comprises a control device configured to control the fuel cell system components, wherein the control device comprises a computer algorithm to indirectly correlate measurements of the fuel cell system components to a difference in the fuel composition.

In one embodiment of the fuel cell power system, the measurements of the fuel cell system components includes a system voltage and a temperature of a catalytic oxidizer. In another embodiment of the fuel cell power system, the measurements of the fuel cell system components includes a system voltage and a temperature of a reformer. In a further embodiment of the fuel cell power system, the measurements of the fuel cell system components includes a system voltage and a temperature of an exhaust air.

The fuel cell power system may comprise a control device. The control device is configured to make or take the measurements of the fuel cell system components. The fuel cell power system, wherein the computer algorithm of the control device analyzes the measurements of the fuel cell system components to indirectly correlate measurements of the fuel cell system components to a difference in the fuel composition.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
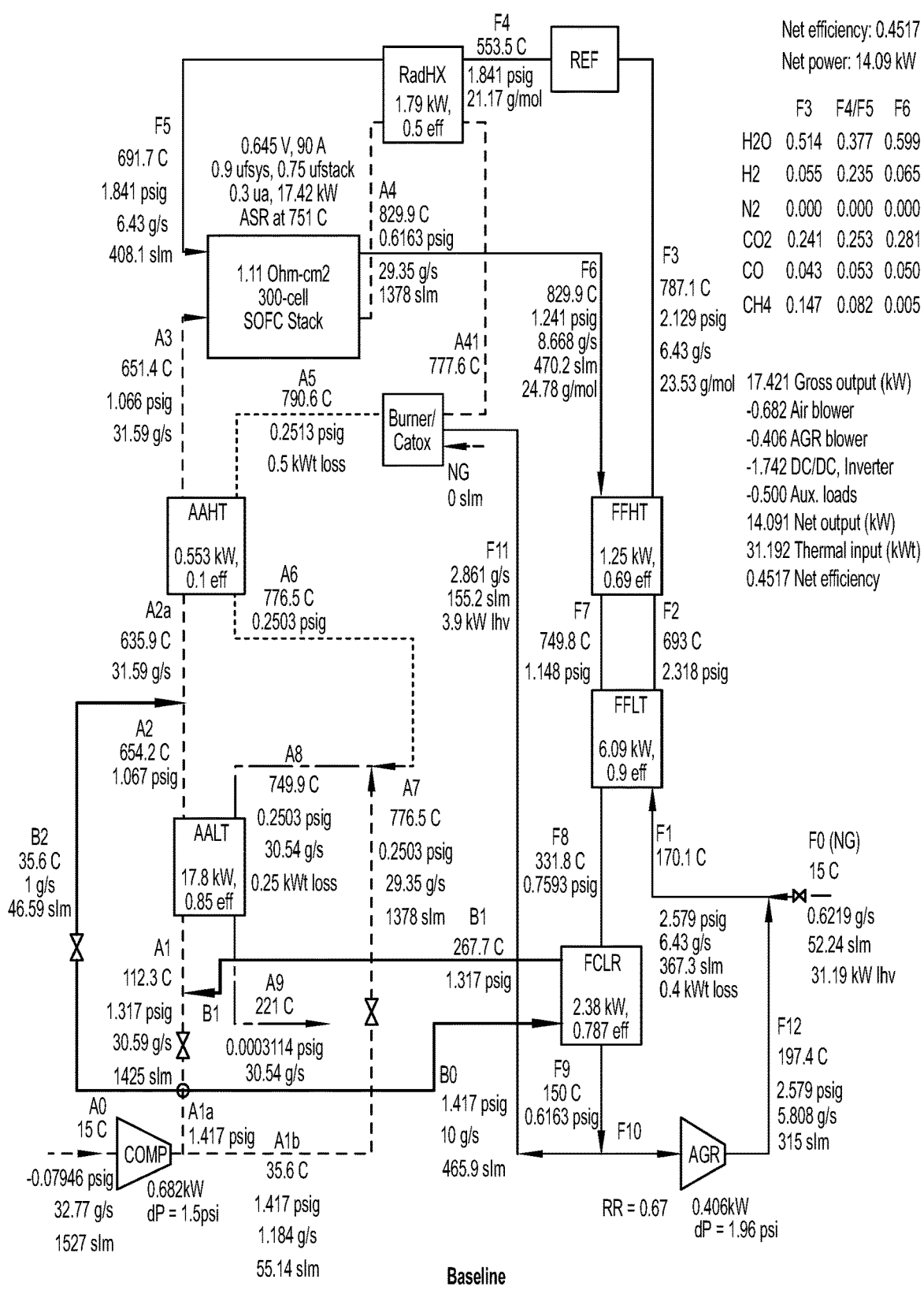
FIG. 1 is a schematic of a baseline fuel cell power system configuration known in the art.

Compensation is the process of regulating, adapting, and/or adjusting the air flow, temperature, pressure, current/voltage, efficiency, fuel utilization, or other parameters of a fuel cell power system in order to counteract and/or balance any deleterious, detrimental, or negative effects encountered by the fuel cell power system when a fuel or a fuel composition (e.g., natural gas or NG) provided to the fuel cell system is not steady, but is instead variable, changing, or inconsistent. The present disclosure is directed to a method for a fuel cell system to identify fuel composition variations and compensate for fuel composition variations that may negatively affect the fuel cell, fuel cell stack, or fuel cell system.

The present method and fuel cell power system to identify and compensate for that fuel composition variation in a fuel cell, a fuel cell stack, and fuel cell systems is advantageous. The present method and fuel cell power system is able to prevent, reduce, and/or avoid detrimental effects such as carbon deposition in the reformer or stack, as well as an increase in the amount or fraction of unreformed fuel to the fuel cell stack or system that is caused by fuel composition variations or inconsistencies. The method of the present disclosure for a fuel cell power system to identify and compensate for fuel composition variations may comprise the fuel cell systems and/or the fuel cell stacks. The fuel cell power system, the fuel cell systems, and the fuel cell stacks of the present disclosure may comprise the fuel cells including a plurality of fuel cells.

The fuel cells of the fuel cell power system of the present disclosure may include, but are not limited to, a phosphoric acid fuel cell (PAFC), a molten carbonate fuel cell (MCFC), a proton exchange membrane or polymer exchange membrane fuel cell (PEMFC), and a solid oxide fuel cell (SOFC). In at least one embodiment, the fuel cell of the fuel cell power system comprises, consists essentially of, or consists of the SOFC (see FIGS. 1-3). In at least one embodiment, the fuel cell of the fuel cell power system comprises, consists essentially of, or consists of a plurality of SOFCs (see FIGS. 1-3).

Solid oxide fuel cells or SOFCs use a solid material, typically a ceramic material (e.g., yttria-stabilized zirconia (YSZ) or cerium gadolinium oxide (CGO)) as the electrolyte between the anode and cathode. SOFCs require high operational temperatures (e.g., 800-1000° C.) to conduct energy and can be run on a variety of fuels, particularly fuels containing hydrogen or hydrogen atoms, such as natural gas. The high operating temperature of SOFCs is primarily related the physical properties of the ceramic electrolyte, which has an ionic conductivity that is optimal at high temperatures. Thus, SOFCs are able to generate power to support industrial (e.g., equipment), stationary (e.g., 100 kW-1 MW), and transportation (e.g., 1-10 kW) applications.

SOFCs differ from other fuel cell types in that the negatively charged oxygen ions from the cathode of the fuel cell travel to the anode of the fuel cell to electrochemically react with the positively charged hydrogen ions. In most other fuel cells, the positively charged hydrogen ions travel from the anode to the cathode of the fuel cell where the electrochemical reaction occurs. In addition, solid oxide fuel cells or SOFCs are capable of internally reforming hydrocarbons, such as methane (natural gas), propane, and butane to produce hydrogen to fuel a fuel cell, a fuel cell stack, or fuel cell system.

In addition to the fuel cells (e.g., SOFCs), the method and fuel cell power system of the present disclosure may also comprise several additional balance of plant (BOP) systems or components. For example, the instant method and fuel cell power system may comprise the additional components, including but not limited to the following: a reformer (REF), a compressor (COMP), a burner and/or catalytic oxidizer (Burner/Catox), or a combination thereof (Burner/Catox), a blower (e.g., an added gas recycle (AGR) blower), an inverter, a motor, a valve (e.g., an intake, bypass, exhaust, or wastegate valve), a heat exchanger, a humidifier, a fuel cell, a fuel cell stack or system, an intake, a turbine, an exhaust, or an intercooler (see FIGS. 1-3).

In a fuel cell power system embodiment of the present disclosure (see FIGS. 1-3), the heat exchanger is any type of heat exchanger sufficient for its standard purpose of exchanging heat from one fluid to another, including but not limited to an air to air high temperature heat exchanger (AAHT), an air to air low temperature heat exchanger (AALT), a fuel cooler heat exchanger (FCLR), a fuel to fuel low temperature heat exchanger (FFLT), a fuel to fuel high temperature heat exchanger (FFHT), or a radiation heat exchanger (RADHX). One embodiment of the present fuel cell power system, a heat exchanger comprises an air to air high temperature heat exchanger (AAHT; see FIGS. 1-3). In another fuel cell power system embodiment, the reformer is an ethane reformer (C2REF).

Figure 2:
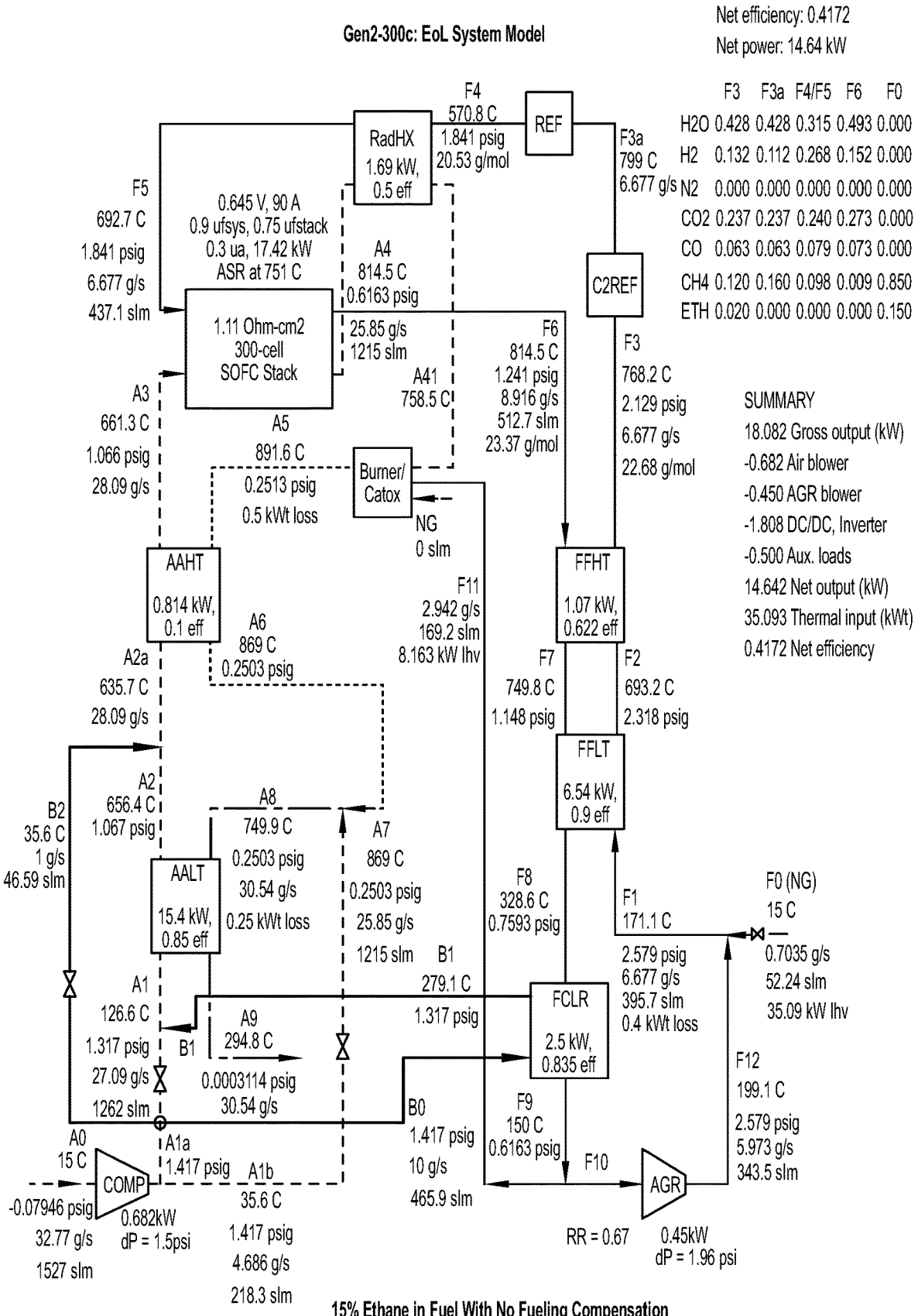
FIG. 2 is a schematic of a fuel cell power system configuration where 15% ethane fuel is introduced into the baseline fuel cell power system of FIG. 1 with no compensation.
Figure 3:
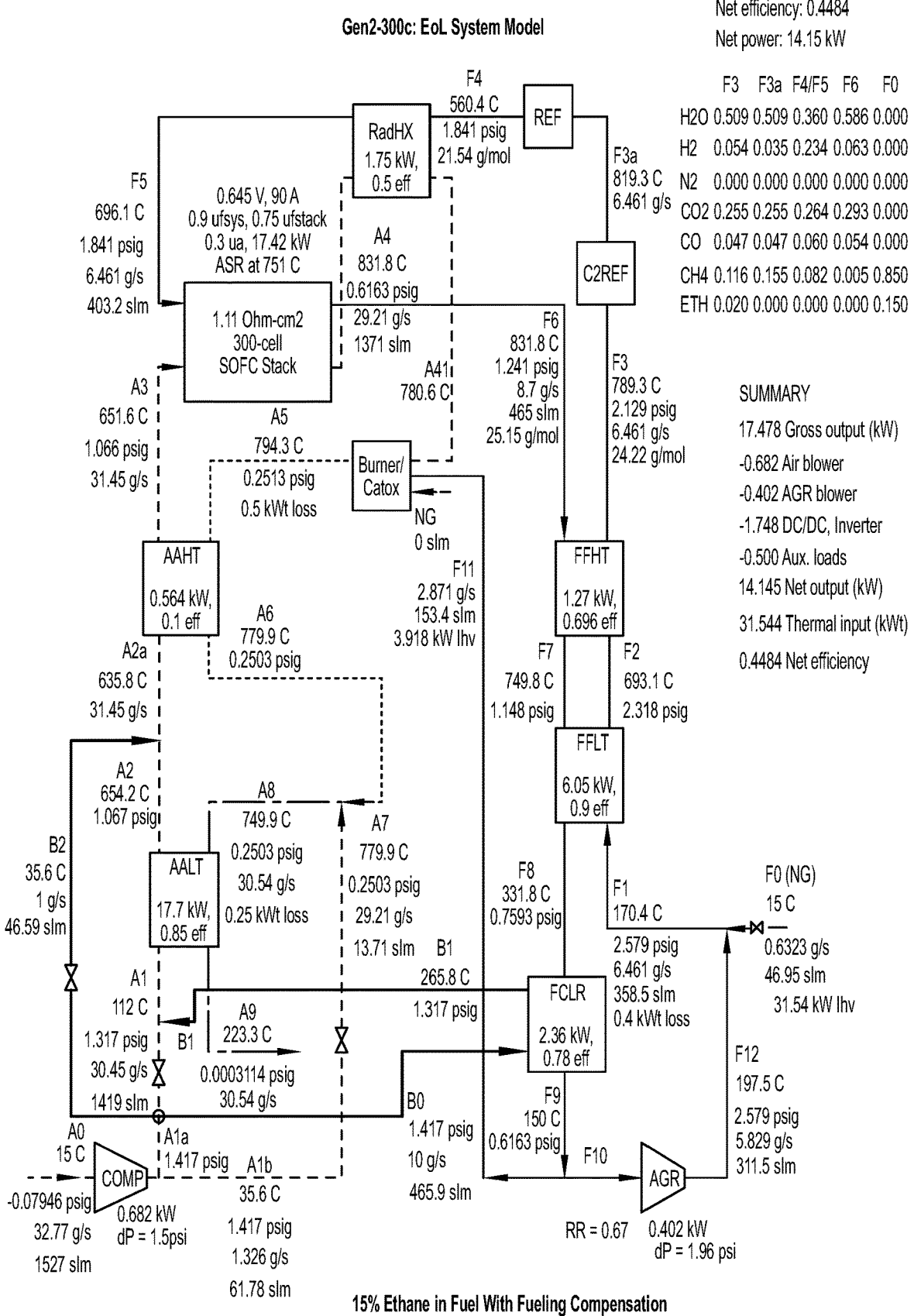
FIG. 3 is a schematic of a fuel cell power system configuration where 15% ethane fuel is introduced into the baseline fuel cell power system of FIG. 1 with compensation.

The of the fuel cell power system or BOP components is connected, configured, and/or coupled together in the fuel cell power system or method of the present disclosure (see FIGS. 1-3). In an exemplary embodiment, components of the fuel cell power system is connected, configured, and/or coupled together in series so as to form a sealed and/or air-tight system for effectively moving, flowing, and/or handling of fluid in order to allow any excess or waste fluid, such as air, to exhaust or exit the system. Fluid (e.g., air, fuel, and/or water) is flow from one component at the beginning of the series to and through intermediate components (e.g., compressor, heat exchanger, and fuel cell stack components). Fluid may continue from the beginning components to and/or through intermediate components and to and/or through final components at the end of the system to exhaust or exit the system.

In the present method and fuel cell power system (see FIGS. 1-3), the position of the components or features is defined based upon the position of the component or feature in relation to the fuel cell or fuel cell stack. For example, components or features located in the air flow path comprising reference points A0-A41 on the left side of FIGS. 1-3 of the fuel cell power system, which may comprise, consist essentially of, or consist of the of the compressor (COMP), the air to air high temperature heat exchanger (AAHT), the solid oxide fuel cell stack (SOFC Stack), the burner and/or catalytic oxidizer (Burner/Catox), and the air to air low temperature heat exchanger (AALT) of the fuel cell power system (see FIGS. 1-3). Conversely, components or features located in the fuel flow path comprising reference points F0-F10 on the right of the fuel cell power system, may comprise, consist essentially of, or consist of the of the reformer (REF and C2REF), the fuel to fuel high temperature heat exchanger (FFHT), the solid oxide fuel cell stack (SOFC Stack), a fuel cooler heat exchanger (FCLR), the burner and/or catalytic oxidizer (Burner/Catox), the anode gas recycle (AGR) blower, and the fuel to fuel low temperature heat exchanger (FFLT) of the fuel cell power system.

The present method for a fuel cell power system to identify and compensate for fuel composition variations in the fuel cell systems and/or the fuel cell stacks comprises utilizing fuel cell (e.g., SOFC) system and process property measurements. Generally, the present method and system provides a variety of sensors or detectors for measuring, detecting, ascertaining, and/or obtaining fuel cell power system parameters. A sensor or a detector of the present method or system comprises a device to measure, detect, ascertain, and/or obtain t fuel cell power system parameters related to the fuel composition variation. For example, a sensor or detector of the present disclosure may comprise a voltage sensor, a current sensor, a temperature sensor, a pressure sensor, or other types of a sensing means that can detect fluctuations, inconsistencies, anomalies, deviations, or variations in the fuel composition. Multiple types and different numbers of sensors is comprised by the present method or system.

For example, one, two, three, four, five, six, the, two or more, three or more, four or more, five or more, or a plurality (e.g., more than six) of fuel cell power system parameters in order to identify or determine whether a fuel composition variation has occurred. Fuel cell system and process parameters that are measured, assessed, and/or analyzed individually, together, and/or in combination in the present system and method comprise, consist essentially of, or consist of a temperature, a flow rate (e.g., air, fuel, or exhaust flow), a voltage, a pressure, a current, a heat and/or heat balance, fuel utilization, fuel burn capacity, and other metrics or control algorithms.

A significant change (e.g., statistically significant) and/or a substantial change (e.g., not stastistically significant but notable) in one or more of these types of fuel cell parameters may be compared to a predicted change, which are based on a baseline or control, and indicates a fuel composition variation of the present disclosure. Typically, a substantial change or difference in one or more fuel cell composition paramaters fluctuates (e.g, increase or decrease) by about 5% or greater, about 10% or greater, about 20% or greater, about 25% or greater, and greater than 25%. The subtantial change in one or more of the fuel cell system parameters is particularly correlated to a fuel cell composition variation when other parameters, metrics, or conditions remain constant—such that the parameters do not substantially or significantly change if at all and/or operation within its standard operational tolerance band or deviation. In some cases, a substantial change or difference (e.g, increase or decrease) in one or more fuel cell composition parameters is not observed if the fuel cell system measurements only change by less than 5%, less than 10%, less than 20%, %, less than 20%, including any specific or range of percentaes comprised therein.

In one embodiment, the fuel cell system temperature that is measured during the present method is any fuel cell power system temperature (e.g., A0-A41 and F0-F10). In another embodiment, the fuel cell system temperature that is measured during the present method is any single or multiple fuel cell system temperatures occurring in the air flow path only (e.g., temperatures occurring at A0-A41) or the fuel flow path only (e.g., temperatures occurring at F0-F10). For example, the temperatures of A0-A41 and/or F0-F10 range from about 0° C. to about 1000° C., including any specific temperature or range comprised therein (see FIGS. 1-3). In one embodiment, the temperature of A0-A41 and/or F0-F10 may range from about 15° C. to about 1000° C., from about 15° C. to about 900° C., from about 15° C. to about 850° C., from about 15° C. to about 830° C., from about 15° C. to about 750° C., and from about 15° C. to about 660° C. Notably, system parameters of the air flow path (e.g., temperature, current, voltage, etc.) provide significantly more information to the present system or method regarding variations in the composition of the fuel cell than the parameters of the fuel flow path.

In another embodiment, the fuel cell system temperature that is measured during the present method is any fuel cell system temperature in the air flow path occurring after the Burner/Catox (e.g., temperatures occurring at A5-A9). For example, the temperatures of A5-A9 ranges from about 0° C. to about 1000° C., including any specific temperature or range comprised therein (see FIGS. 1-3). In one embodiment, the temperature of A5-A9 may range from about 15° C. to about 900° C., from about 50° C. to about 950° C., from about 100° C. to about 850° C., from about 150° C. to about 950° C., and from about 200° C. to about 900° C.

In an additional embodiment, the fuel cell system temperature that is measured during the present method is any fuel cell system temperature that comprises, consists essentially of, or consists of the Burner/Catox outlet temperature of the system measured at A5 (see FIGS. 1-3). For example, the temperatures of A5 ranges from about 700° C. to about 900° C., including any specific temperature or range comprised therein (see FIGS. 1-3). In one embodiment, the temperatures of A5 ranges from about 700° C. to about 800° C., including any specific temperature or range comprised therein (see FIGS. 1-3).

In an additional embodiment, the fuel cell system temperature that is measured during the present method is any fuel cell system temperature that comprises, consists essentially of, or consists of the exhaust air temperature of the system measured at A9 (see FIGS. 1-3). For example, the temperatures of A9 ranges from about 200° C. to about 400° C., including any specific temperature or range comprised therein (see FIGS. 1-3). In one embodiment, the temperatures of A9 ranges from about 200° C. to about 400° C., including any specific temperature or range comprised therein (see FIGS. 1-3).

In yet a further embodiment, the heat balance or temperature across any heat exchanger in the air flow path, such as an air to air heat exchanger (e.g., AAHT), is measured by the present fuel cell power system and method to assess the fuel composition. The ability to measure and identify the composition of the air going into an air side heat exchanger as compared to the composition of the air coming out of an air side heat exchanger is very telling about the actual fuel composition. For example, in one embodiment, the temperature of the air to air heat exchanger inlet (A2a, A3, A5, and A6) is measured, observed, and/or identified in order to enable the present method or system to determine whether a fuel composition variation has occurred in the system (see FIGS. 1-3).

In particular, the ability to measure the change in energy (ΔQ) by measuring the Q of the exhaust stream of the air side heat exchangers (e.g., AAHT or AALT in FIGS. 1-3) has been shown by the present method and system to serve as a suitable surrogate, individually, together, or in combination with other system parameters, to indirectly measure the fuel composition variation. Specifically, the AAHT is able to calculate the mass flow rate that cannot be directly measured or assessed without gas analyzers or other large expensive equipment. Instead, in this embodiment, the mass flow of air or exhaust across the AAHT is able to be assessed and calibrated based on baseline conditions such that a measured or observed change in mass flow or pressure (ΔP) across the AAHT also correlates to and therefore indirectly indicates a change in fuel composition has occurred in the absence of practical ability to assess such fuel composition variation directly as is available in a laboratory setting where gas analyzers and other equipment is easily employed.

Dilution air in the fuel cell power system may also be used to control temperature of the system. For example, in order to increase temperature within the fuel cell system, air is reduced and/or removed from the system. Conversely, in order to decrease the temperature of the system, dilution air is introduced and/or increased within the fuel cell system.

In another embodiment, the fuel cell system temperature that is measured during the present method is a combination of measurements from both the air flow path and the fuel flow path. For example, in one embodiment, the temperature that is measured, observed, and/or identified is any fuel cell system temperature that comprises, consists essentially of, or consists of the outlet temperature of the catalytic oxidizer (A5), the temperature of the reformer (F3a/F4/F5), and the exhaust air temperature of the system measured at A9, individually, together, or in combination (see FIGS. 1-3). In another embodiment, the fuel cell system temperature that is measured by the present method is selected from the group consisting of the temperature of the catalytic oxidizer (A5), the temperature of the reformer (F3a/F4/F5), and, the temperature of the system measured at A9, individually, together, or in combination.

An important fuel side parameter that is assessed or measured individually, together, or in combination with fuel cell system temperature parameters (e.g., including, but not limited to the outlet temperature of the catalytic oxidizer (A5), the temperature of the reformer (F3a/F4/F5), and/or the exhaust air temperature of the system measured at A9) is the system voltage or total system voltage. The total system voltage of the fuel cell, fuel cell system, or fuel cell stack is measured at any system component generating power from the system, such as at the fuel cell stack, an inverter, or at different components (not shown in FIGS. 1-3).

In addition, the total system voltage is calculated by the power provided by a single fuel cell (e.g., 0.645, 0.67, 0.647 V in FIGS. 1, 2, and 3, respectively) multiplied by the number of fuel cells in the fuel cell stack or fuel cell system (e.g., 300 fuel cells; see FIGS. 1-3). Thus, the fuel cell system exemplified in FIGS. 1-3 generate about 193.5 V, 194.1 V, and 201 V total power or total system voltage, respectively. In addition, the system voltage is measured by any methods, techniques, or equipment known in the art.

In one embodiment, a measured or observed increase in the system voltage together or in combination with an increase measured or observed in the exhaust air temperature of the system (e.g. A9) indicates that a substantial difference or change in fuel cell composition has occurred. In another embodiment, a measured or observed increase in the system voltage together or in combination with an increase in temperature of the reformer (F3a/F4/F5), indicates that a substantial difference or change (i.e., a variation) in fuel cell composition has occurred.

In an exemplary embodiment, a substantial increase in temperature at the outlet of the catalytic oxidizer (Catox; A5) is measured or observed (see FIGS. 1-3). Comparing FIGS. 1 (baseline) and 3 (improved system having 15% ethane), a substantial increase or change in temperature of at least about 100° C. in the Catox is indicative of a fuel cell composition variation. In some embodiments, a substantial temperature increase in the Catox may range from about 50° C. to about 850° C., including any specific or range of temperature comprised therein. For example, a substantial temperature increase in the Catox from about 100° C. to about 500° C., from about 75° C. to about 450° C., from about 250° C. to about 750° C., from about 150° C. to about 800° C. indicates a fuel cell composition variation.

The Catox temperature may also be measured, observed, and/or identified together, at the same time, within a limited amount of time, or simultaneously with a measured or observed increase in the system voltage. In particular, an increase in the Catox outlet temperature (e.g., A5) and the system voltage, while all other system parameters (e.g., temperatures, pressure, current, etc.) remain constant, normal, or steady, is a clear indication or symptom that a significant or substantial change, difference, or variation in the fuel composition has occurred. In an illustrative embodiment of the present method or system, when the Catox temperature (A5) is increased together with the system voltage increased, and the system current remains the same, this is clear indication that significantly heavy or heavier hydrocarbons than were expected to be present in the fuel or fuel composition have been detected or identified in the air flow (i.e., a change or difference in fuel composition). Importantly, an increase in one, two, three or all four of the following fuel cell power system parameters indicates, is associated with, and correlates to a change, a difference, or a variation in a fuel composition: 1) the outlet temperature of the catalytic oxidizer (A5), 2) the temperature of the reformer (F3a/F4/F5), 3) the exhaust air temperature of the system (A9), and 4) the total system or stack voltage.

In particular, an observation or detection of an increase in exhaust temperature (A9) with a simultaneous, combined, or coupled increase of the total stack voltage is indicative or predictive of a fuel cell composition variation. Notably, in a standard or normal fuel cell system, increasing exhaust temperature (A9) would invariably lead to a lower stack voltage. Detection of a substantial increase in exhaust temperature coupled with a substantial increase in fuel cell stack or system voltage indicates the presence of a fuel cell composition variation.

However, this is not the case if the Catox temperature (A5) is increased, but the system voltage is steady or decreased. In fact, if the Catox temperature (A5) is increased and the system voltage is constant or decreased, the fuel composition being used by the fuel cell is not variable, but is steady and very energy rich, such that the system is providing too much energy to the system. In order to compensate for such energy inefficiencies due to a high quality fuel composition providing too much energy to the system, the present method and fuel cell system may compensate by regulating, stopping, and/or reducing the amount of fuel flow provided to and/or used by the system in order to increase the fuel efficiency of the fuel cell power system. Doing so also avoids reaching and/or exceeding the maximum mechanical limits of the fuel cell system components (e.g., Catox, heat exchangers fuel cells, etc.). In one embodiment, the present method and system comprise a device to regulate the fuel flow (e.g., a fuel flowmeter) to reduce, stop, or decrease the fuel flow provided to the fuel cell system, such as at point F0 (see FIGS. 1-3).

Fuel flow, fuel utilization, and/or current availability in the fuel flow path are also sufficient metrics or factors to be measured, observed, and/or considered in the present method and system to identify and compensate for fuel composition variability. For example, as would be understood by a person or ordinary skill in the art, any fuel flow rate or temperature measured in the fuel flow path may provide significant information regarding the fuel composition (see F0-F10 of FIGS. 1-3). In particular, the temperature and/or fuel flow rate at the entry of the Catox (F11) is specifically important to assessing the fuel composition and any variability of the fuel composition in the present method and system.

With regard to fuel utilization, the composition of fuel (e.g., natural gas or NG) is typically assumed in the industry and/or art to be comprised by about 100% methane. In addition, the typical composition fuel is assumed to have a burn capacity of about 1000 BTUs/ft$^3$. Even when the fuel composition varies significantly (e.g., fuel comprises 10-20% ethane and 80-90% methane), the fuel utilization and burn capacity of the fuel can often remain steady or relatively unchanged at about 1000 BTUs/ft$^3$.

However, when the fuel composition comprises 10-20% ethane (e.g., about 15% ethane) and 80-90% methane (e.g., about 85% methane), while the fuel utilization and burn capacity of the fuel remains steady or relatively unchanged at about 1000 BTUs/ft³, more current is actually produced by a fuel cell system or method of the present disclosure. In particular, under these conditions, more electrons are produced per energy unit (BTU), such that there is an increase in current availability and an increase in fuel efficiency, even though the fuel utilization and burn capacity remain constant or steady at about 1000 BTUs/ft³. This situation (e.g., when there is increased current availability and fuel efficiency, but unchanged fuel utilization or current availability) provides additional circumstances where the present method and system indicate to a user or operator of the fuel cell system that a fuel composition variation has occurred.

The fuel measured at the fuel reformer (REF) of the fuel flow path of the claimed method and system in also particularly important. The reformer (REF) is the first system component in the fuel flow path to sense and/or experience any change in fuel composition (see FIGS. 1-3). In particular, the fuel composition measured at the fuel reformer inlet (F3a) and at the fuel reformer outlet (F4) is likely one of the most important parameters in the fuel flow path to assess for fuel composition variation identification.

These system and parameter measurements is used individually, together, in combination, or collectively, as an indirect mechanism, marker, surrogate, predictor, corollary, or substitute for directly detecting and/or diagnosing the actual fuel composition variations that are comprised by a fuel cell or fuel cell system. Of particular importance for the present system and method, are the air side and fuel side compositions, such as the fuel cell stack inlet (F5), and variations thereof. Thus, the present method comprises measuring and/or monitoring the of the following air or fuel side system parameters, including but not limited to ethane composition, the temperature (e.g., inlet or outlet temperature) of a catalytic oxidizer (Catox) of the fuel cell power system, the system voltage, the change in mass flow rate and/or pressure across system heat exchangers (e.g., air side heat exchangers), dilution air, individually, together, or in combination to identify and/or compensate for fuel composition variations. Individually, together, and in multiple specific or particular combinations, these measurable fuel cell system parameters is measured and analyzed to enable indirect assessment and identification of the fuel composition and any variations of the fuel composition comprised by the fuel cell system.

More specifically, the present method and system comprises, consists essentially of, or consists of the control systems to measure, detect, analyze, and/or determine a fuel composition variation has occurred based on the measurable fuel cell power system parameters described herein (e.g., temperature, mass flow rate, heat, pressure, etc.). While any control system, including a human or human system, is sufficient to measure, detect, analyze, and/or determine a fuel composition variation has occurred, exemplary embodiment of the present control system comprises, consists essentially of, or consists of electronic systems, computer systems, and/or system control devices.

Exemplary electronic systems, computer systems, and/or system control devices of the present method and system automatically, mathematically, and/or algorithmically measure, detect, analyze, identify, and/or determine whether a fuel composition variation has occurred based on measurable fuel cell power system parameters described herein (e.g., temperature, mass flow rate, heat, pressure, etc.). For example, the electronic systems, computer systems, and/or system control devices is physically attached or detached from the fuel cell power systems or components, but enabled and/or configured to directly, remotely, virtually, and/or electronically command and control the operation, functionality, and performance of associated fuel cell systems and components. In addition, the electronic systems, computer systems, and/or system control devices is internal or external to the fuel cell power systems or components, but enabled and/or configured to directly, remotely, virtually, and/or electronically command and control the operation, functionality, and performance of associated fuel cell systems and components.

The controller or control device of the present disclosure may be embodied as any type of computation or computer device capable of performing the functions described herein, including, but not limited to, a server (e.g., stand-alone, rack-mounted, blade, etc.), a network appliance (e.g., physical or virtual), a high-performance computing device, a web appliance, a distributed computing system, a computer, a processor-based system, a multiprocessor system, a smartphone, a tablet computer, a laptop computer, a notebook computer, and a mobile computing device.

In one embodiment, a processor (e.g., a microprocessor) comprises several inputs, that are applied or implemented by the controller to affect the functioning of the fuel cell system. The inputs are provided by an operator or publicly or privately available information. In one embodiment, the microprocessor is based on several inputs, and applied or implemented by the control device or controller in real time or automatically to affect the functioning of the fuel cell system. In one embodiment, the controller is in the same computing device as the processor. In other embodiments, the controller may include a memory, a processor, and a communication system, as previously described.

The computer or electronic control systems and devices of the present method or system may comprise, consist essentially of, or consist of a logic. The logic may further comprise, consist essentially of, or consist of a mathematical formula or an algorithm, such as a computer algorithm, in which the measurable fuel cell power system parameters described herein (e.g., temperature, mass flow rate, heat, pressure, etc.) are input and analyzed in order to ascertain, identify, predict, and/or determine that a fuel composition variation has occurred. In exemplary embodiments, the present computer or electronic control systems or devices may utilize and/or implement the logic, mathematical formula, or algorithm to determine, identify, and electronically, virtually, remotely, or digitally communicate to the fuel cell system whether a fuel composition variation has occurred. Exemplary control systems of the present method and disclosure may automatically, immediately, or in real-time analyze the measurable fuel cell power system parameters described herein. In an exemplary embodiment, the system control device comprises, consists essentially of, or consists of a computer algorithm or a mathematical algorithm.

Importantly, the present method and system also provides compensation for such identified fuel composition differences, changes, or variations in order to improve, increase, optimize, or maximize the efficiency of the fuel cell system. Likewise, the present method and system also provides compensation for such identified fuel composition variations in order to reduce, minimize, prevent, and/or mitigate detrimental effects and damage to the fuel cells, stacks, or systems. For example, the computer system and/or electronic control device of the present method or system may automatically, immediately, or in real-time analyze and/or generate a compensation command or signal that is automatically, immediately, or in real-time transmitted and/or provided to the components of the fuel cell power system in order to act. Such action by the fuel cell system components is generally to correct or compensate for identified fuel composition variations (i.e., a change or difference), such as to increase or decrease temperature, mass flow, heat, pressure, etc. of the air or fuel flow within the system.

Such compensation command signals is manually, remotely, automatically, and/or electronically transmitted from the computer system or control device to the fuel cell power system in order to manipulate, regulate, and/or calibrate the fuel cell systems parameters in a way that positively adjusts for the identified fuel composition variation in order to avoid, prevent, or reduce damage to the fuel cell power system and components (e.g., exceeding the mechanical limits of fuel cell system components) including the fuel cells. In an illustrative embodiment, the computer system and/or electronic control device may manually transmit a command to human user that may manually transmit that information directly into control devices physically located on the fuel cell system. In an alternative and preferable embodiment, the computer system and/or electronic control device may electronically, digitally, virtually, remotely, transmit an automatic or electronic command signal to a fuel cell power system to which it is not physically attached or affixed. In some embodiments, the computer system and/or electronic control device is in any vicinity or no physical vicinity close at all to the actual fuel cell system that it controls.

In one non-limiting illustrative embodiment, the computer system and/or electronic control device may transmit an automatic or electronic command signal to the air to air catalytic oxidizer (Catox) to reduce the outlet temperature in order to balance an identified increase of ethane (i.e., reduction of methane) in its fuel composition. In another non-limiting embodiment, the computer system and/or electronic control device may also transmit an automatic or electronic command signal to the reformer (REF) to reduce the fuel reformer outlet temperature (F4) in order to balance an identified increase of ethane (i.e., reduction of methane) in its fuel composition. In another embodiment, the computer system and/or electronic control device may also transmit an automatic or electronic command signal to the air to air heat exchanger (AAHT) to reduce the heat balance or mass flow across it in order to balance an identified increase of ethane (i.e., reduction of methane) in its fuel composition of a further embodiment. In yet a further embodiment, the computer system and/or electronic control device may also transmit an automatic or electronic command signal to the anode gas recirculation (AGR) blower to change the off gas recirculation recycle ratio (RR) and therefore the amount of fuel recycled back into the system (see FIGS. 1-3). Finally and importantly, in one embodiment of the present method and system to identify and compensate for fuel composition variations in a fuel cell system, no water is used or injected into the fuel cell system.

The present method and fuel cell power system to identify and compensate for fuel composition variation in a fuel cell, a fuel cell stack, and fuel cell systems utilizing a control device comprising a mathematical, computer, and/or algorithmic logic is advantageous in that it preemptively and proactively prevents, reduces, mitigates, and/or avoids detrimental effects to the fuel cell, the fuel cell stack, or fuel cell system caused by fuel composition changes, difference, variations, and/or inconsistencies. Any such embodiment of a mathematical or computer logic or algorithm could include any values, units, measurements, or calculations that correlate or associate with a difference, change, or variation in a fuel composition. In an exemplary embodiment, a logic controller or control device takes data from sensors, performs mathematical algorithms, and then takes actions to increae efficiency.

For example, embodiments of the algorithm could include, but are not limited to calculations, such as: 1) catox inlet and/or outlet temperature that rise individually or in combination (as the most basic form), 2) catox complete inlet and/or outlet conditions (e.g., temperature, mass flow, composition). In particular, the following parameters or measurements have particular relevancy, association, and/or correlation to a variation, a change, or a difference in fuel composition, such that they may individually or in combination be assessed and/or incorporated in to the present method, system, and/or algorithm or logic: 1) anode off gas, 2) cathode outlet air, 3) catox dilution air (not shown), and/or 4) fuel cell stack voltage. In an exemplary embodiment, one, two, three, or all four of these parameters or measurements are part of a mathematical or computer algorithm comprised by a control device (e.g., a computer, smartphone, or tablet) to determine performance and/or fuel composition change. Notably, the AAHT performance is measured based on thermodynamic analysis of inlet/outlet (I/O) streams of the fuel cell system since mass flow of the cathode air inlet is measured, and Delta T from both sides would give a measure of total mass flow (or mass×Cp) in the exhaust stream.

The present methods and systems also provide an indirect mechanism to identify fuel compositions and variations in fuel compositions that does not utilize large expensive equipment (e.g., gas analyzers and anemometers) currently required to directly measure the fuel composition. As such, the methods and systems of the present disclosure are intended to enable efficient operations, performance, durability, and life of any fuel cell power system, including the plurality of fuel cells, fuel cell stacks, and fuel cell system comprised therein.

EXAMPLES

Illustrative embodiments of the compositions, systems, components, and/or methods of the present disclosure are provided by way of examples. While the concepts and technology of the present disclosure are susceptible to broad application, various modifications, and alternative forms, specific embodiments will be described here in detail. It should be understood, however, that there is no intent to limit the concepts of the present disclosure to the particular forms disclosed, but on the contrary, the intention is to cover all modifications, equivalents, and alternatives consistent with the present disclosure and the appended claims. The following experiments were conducted to determine the effects of each component on the functionality and capacity of the present fuel cell power system and air handling system to operate in high altitude environments.

Example 1: Baseline Fuel Cell Power System

One embodiment of a baseline fuel cell power system is shown in FIG. 1. The illustrative baseline fuel cell power system comprises multiple air side (e.g., AALT, AAHT, COMP, SOFC Stack, Burner/Catox, etc.) and fuel side components (e.g., REF, RadHX, FFHT, FFLT, FCLR, AGR, SOFC Stack, Burner/Catox, etc.), as previously described (see FIG. 1). Importantly, the exemplified fuel cell power system comprises a fuel cell stack (e.g., a SOFC stack). The baseline fuel cell system as shown comprises fuel that has a composition assumed and/or confirmed to comprise about 100% methane with no or extremely limited, low (e.g., below 15%, below 10%, below 5%, about 1-5%, below 1%, or immeasurable amounts of ethane.

The baseline fuel cell system demonstrated that its net efficiency is about 45.17% and its net power is about 14.09 kW. In addition, the measurements of various fuel composition components (e.g., water, hydrogen ($H_2$), nitrogen ($N_2$) carbon dioxide ($CO_2$), carbon monoxide (CO), and methane ($CH_4$)) at various points in the fuel flow path of the fuel cell are also shown in FIG. 1. Notably, the measurable values of the fuel composition across the fuel reformer (F4 and F5) and the anode gas recirculation (AGR) blower are indicated.

Example 2: Fuel Cell Power System with 15% Ethane Introduced to Fuel with No Fueling Compensation An embodiment of a fuel cell system whose fuel comprises, consists essentially or, or consists of a fuel that comprises less than 100% methane is shown in FIG. 2. More specifically, FIG. 2 is a schematic of the baseline fuel cell system of FIG. 1 where instead of fuel comprising 100% methane, the fuel composition of FIG. 2 comprises about 80-85% methane, such as with 15-20% ethane). More specifically, the fuel cell system of FIG. 2 comprises about 15% ethane. In addition, no fueling compensation was provided to counteract the detrimental effects of the reduced methane and/or increased ethane composition of the fuel on the fuel cell power system of FIG. 2.

The fuel cell system of FIG. 2 comprising 15% ethane and no fuel compensation demonstrated that its net efficiency was about 41.72%, which was decreased compared to the net efficiency of the baseline fuel cell system of 45.17%. However, the net power generated by the fuel cell system of FIG. 2 was about 14.64 kW, which was slightly increased compared to the 14.09 kW of power generated by the baseline fuel cell power system.

Example 3: Fuel Cell Power System with 15% Ethane Introduced to Fuel with Fueling Compensation An exemplary embodiment of a fuel cell system whose fuel comprises, consists essentially or, or consists of about 15% ethane is also shown in FIG. 3. However, distinct from the fuel cell system of FIG. 2, which also comprised about 15% ethane in its fuel composition, fueling compensation was provided to counteract the detrimental effects of the reduced methane and/or increased ethane composition of the fuel on the fuel cell power system of FIG. 3. Importantly, the fuel cell system of FIG. 3 provided compensation via manual or electronic commands and/or signals transmitted from a control device to the fuel cell power system or components.

The fuel cell system of FIG. 3 comprising 15% ethane with fuel compensation demonstrated that its net efficiency was about 44.82%. This 44.82% net efficiency of the fuel cell system of FIG. 3 was increased over the 41.72% net efficiency provided by the fuel cell system of FIG. 2 comprising 15% ethane with no fuel compensation. Importantly, the 44.82% net efficiency of the fuel cell system of FIG. 3 was comparable to the 45.17% net efficiency of the baseline fuel cell system of FIG. 1 comprising 100% methane. Accordingly, the ability for the fuel cell system of FIG.

3 to compensate for the identified variation of fuel composition enabled the fuel cell power system of FIG. 3 to relatively maintain net efficiency and avoid any foreseen detrimental effects arising from reduced efficiency (as seen in FIG. 2). Importantly, the flow of the fuel cell system was readjusted in response to sensor parameter data (e.g., temperature and voltage) received by the fuel cell system that indicated a variation in order to compensate for the fuel cell composition variation and operate the fuel cell system efficiently. Otherwise, in the absence of compensation, the fuel cell system efficiency would be lost or detrimentally effected.

Similarly, the about 14.15 kW net power generated by the fuel cell system of FIG. 3 (with fuel compensation) was slightly decreased from the about 14.64 kW net power generated by the fuel cell system of FIG. 2 (with no fuel compensation). However, the about 14.15 kW of net power produced by the fuel cell system of FIG. 3, was comparable and slightly increased from the 14.09 kW of power generated by the baseline fuel cell power system. Accordingly, the ability for the fuel cell system of FIG. 3 to compensate for the identified variation of fuel composition enabled the fuel cell power system of FIG. 3 to relatively maintain net power as observed in the baseline model and avoid any detrimental effects arising from producing unnecessary power overgeneration. As such, the method and fuel cell power system utilized in FIG. 3 was observed to be the most advantageous and beneficial to prevent detrimental effects of fuel cell power systems caused by fuel composition changes, differences, or variations in order to increase the life of a fuel cell, a fuel cell stack, or a fuel cell system.

The following numbered embodiments are contemplated and are non-limiting.

1. A method for identifying variations in a fuel composition of a fuel cell power system, comprising:
    measuring the fuel cell system parameters,
    mathematically analyzing the measurements of the fuel cell system parameters, and
    identifying a difference in the fuel composition of the fuel cell power system.

2. The method of clause 1, any other suitable clause, or any combination of suitable clauses, wherein the fuel cell power system comprises the fuel cells selected from the group consisting of a phosphoric acid fuel cell (PAFC), a molten carbonate fuel cell (MCFC), a proton exchange membrane or polymer exchange membrane fuel cell (PEMFC), and a solid oxide fuel cell (SOFC).

3. The method of clause 1, any other suitable clause, or any combination of suitable clauses, wherein the fuel cell power system comprises a balance of plant (BOP) system.

4. The method of clause 3, any other suitable clause, or any combination of suitable clauses, wherein the balance of plant (BOP) system comprises a BOP component selected from the group consisting of a reformer, a compressor, a burner and/or catalytic oxidizer, a blower, an inverter, a motor, a valve, a heat exchanger, a humidifier, a fuel cell, a fuel cell stack or system, an intake, a turbine, an exhaust, and an intercooler.

5. The method of clause 4, any other suitable clause, or any combination of suitable clauses, wherein the valve is selected from an intake valve, a bypass valve, an exhaust valve, or a wastegate valve.

6. The method of clause 4, any other suitable clause, or any combination of suitable clauses, wherein the blower is an added gas recycle blower.

7. The method of clause 4, any other suitable clause, or any combination of suitable clauses, wherein the heat exchanger is selected from an air to air high temperature heat exchanger, an air to air low temperature heat exchanger, a fuel cooler heat exchanger, a fuel to fuel low temperature heat exchanger, a fuel to fuel high temperature heat exchanger, or a radiation heat exchanger.

8. The method of clause 4, any other suitable clause, or any combination of suitable clauses, wherein the reformer is an ethane reformer.

9. The method of clause 4, any other suitable clause, or any combination of suitable clauses, wherein the of the fuel cell power system or the BOP components is connected together.

10. The method of clause 4, any other suitable clause, or any combination of suitable clauses, wherein the of the fuel cell power system and the BOP components is connected together.

11. The method of clause 10, any other suitable clause, or any combination of suitable clauses, wherein the of the fuel cell power system and the BOP components is connected together in series.

12. The method of clause 10, any other suitable clause, or any combination of suitable clauses, wherein the of the fuel cell power system and BOP components is connected to form a closed system.

13. The method of clause 12, any other suitable clause, or any combination of suitable clauses, wherein the close system comprises fluid.

14. The method of clause 13, any other suitable clause, or any combination of suitable clauses, wherein the fluid is air, fuel, or water.

15. The method of clause 13, any other suitable clause, or any combination of suitable clauses, wherein the fluid is flowed from one BOP component to and through an intermediate BOP component.

16. The method of clause 15, any other suitable clause, or any combination of suitable clauses, wherein the intermediate BOP component is selected from the group consisting the reformer, the compressor, the burner and/or catalytic oxidizer (burner/catox), the blower, the inverter, the motor, the valve, the heat exchanger, a the humidifier, the fuel cell, the fuel cell stack or system, the turbine, and the intercooler.

17. The method of clause 13, any other suitable clause, or any combination of suitable clauses, wherein the fluid is flowed from a beginning BOP component to and through an intermediate BOP component to and through a final BOP component.

18. The method of clause 17, any other suitable clause, or any combination of suitable clauses, wherein the final BOP component is located at the exit or exhaust of the fuel cell power system.

19. The method of clause 1, any other suitable clause, or any combination of suitable clauses, wherein measuring the fuel cell system parameters comprises a number of fuel cell system parameters selected from the group consisting of one, two, three, four, five, six, the two or more, three or more, four or more, five or more, and a plurality of fuel cell power system parameters 20. The method of clause 1, any other suitable clause, or any combination of suitable clauses, wherein measuring the fuel cell system parameters comprises measuring a temperature, a flow, a flow path, a voltage, a pressure, a current, a heat, a heat balance, a fuel utilization, a fuel burn capacity, an operation parameter, a metric, or an algorithm.

21. The method of clause 20, any other suitable clause, or any combination of suitable clauses, wherein measuring the voltage comprises measuring a total system voltage.

22. The method of clause 20, any other suitable clause, or any combination of suitable clauses, wherein measuring the temperature comprises measuring a temperature of a catalytic oxidizer, a temperature of a reformer, a temperature of an exhaust air, or a combination thereof.

23. The method of clause 20, any other suitable clause, or any combination of suitable clauses, wherein measuring the temperature comprises only measuring the temperature of an air flow path of the fuel cell system.

24. The method of clause 20, any other suitable clause, or any combination of suitable clauses, wherein measuring the temperature comprises measuring the temperature of an air flow path of the fuel cell system.

25. The method of clause 24, any other suitable clause, or any combination of suitable clauses, wherein measuring the temperature of the air flow path of the fuel cell system comprises measuring the temperature in the air flow path occurring after the burner/catox.

26. The method of clause 24, any other suitable clause, or any combination of suitable clauses, wherein measuring the temperature of the air flow path of the fuel cell system comprises measuring a burner/catox outlet temperature.

27. The method of clause 24, any other suitable clause, or any combination of suitable clauses, wherein measuring the temperature of the air flow path of the fuel cell system comprises measuring a temperature of an exhaust air.

28. The method of clause 24, any other suitable clause, or any combination of suitable clauses, wherein measuring the temperature of the air flow path of the fuel cell system comprises measuring the heat balance or the temperature across any heat exchanger.

29. The method of clause 24, any other suitable clause, or any combination of suitable clauses, wherein measuring the temperature of the air flow path of the fuel cell system comprises measuring the heat across the heat exchanger.

30. The method of clause 29, any other suitable clause, or any combination of suitable clauses, wherein measuring the temperature of the heat across the heat exchanger comprises an air to air heat exchanger or an air to air low temperature heat exchanger.

31. The method of clause 30, any other suitable clause, or any combination of suitable clauses, wherein a mass flow rate of air or exhaust across the air to air heat exchanger correlates to a change in fuel composition.

32. The method of clause 20, any other suitable clause, or any combination of suitable clauses, wherein measuring the temperature comprises only measuring the temperature of a fuel flow path of the fuel cell system.

33. The method of clause 20, any other suitable clause, or any combination of suitable clauses, wherein measuring the temperature comprises measuring the temperature of a fuel flow path of the fuel cell system.

34. The method of clause 20, any other suitable clause, or any combination of suitable clauses, wherein measuring the temperature comprises measuring the temperature of an air flow path and a fuel flow path of the fuel cell system.

35. The method of clause 34, any other suitable clause, or any combination of suitable clauses, wherein measuring the temperature of the air flow path and the fuel flow path of the fuel cell system comprises measuring an outlet temperature of the catalytic oxidizer, a temperature of the reformer, and a temperature of an exhaust air of the fuel cell system, individually, together, or in combination.

36. The method of clause 34, any other suitable clause, or any combination of suitable clauses, wherein measuring the temperature of the air flow path and the fuel flow path of the fuel cell system comprises measuring an outlet temperature of the catalytic oxidizer, a temperature of the reformer, and the temperature of the fuel cell system, individually, together, or in combination.

37. The method of clause 31, any other suitable clause, or any combination of suitable clauses, wherein measuring the temperature of a fuel flow path of the fuel cell system.

38. The method of clause 21, any other suitable clause, or any combination of suitable clauses, wherein measuring the fuel cell system parameters comprises measuring the total system voltage and a temperature of a reformer.

39. The method of clause 21, any other suitable clause, or any combination of suitable clauses, wherein measuring the fuel cell system parameters comprises measuring the total system voltage and a temperature of an exhaust air.

40. The method of clause 21, any other suitable clause, or any combination of suitable clauses, wherein the total system voltage is a product of an amount of power provided by a single fuel cell by the number of fuel cells in the fuel cell system.

41. The method of clause 1, any other suitable clause, or any combination of suitable clauses, wherein measuring the fuel cell system parameters comprises detecting the total system voltage, the temperature of the exhaust air, the temperature of the catalytic oxidizer, or the temperature of the reformer individually or in combination.

42. The method of clause 41, any other suitable clause, or any combination of suitable clauses, wherein detecting the total system voltage comprise detecting an increase in the total system voltage, detecting the temperature of the exhaust air comprises detecting an increase in the temperature of the exhaust air, detecting the temperature of the catalytic oxidizer comprises detecting an increase in the temperature of the catalytic oxidizer, and detecting the temperature of the reformer comprises detecting an increase in the temperature of the reformer.

43. The method of clause 42, any other suitable clause, or any combination of suitable clauses, wherein detecting the increase in the total system voltage and the increase in the temperature of the exhaust air indicates a change in fuel cell composition.

44. The method of clause 21, any other suitable clause, or any combination of suitable clauses, wherein measuring the fuel cell system parameters comprises measuring the total system voltage and a temperature of a catalytic oxidizer.

45. The method of clause 44, any other suitable clause, or any combination of suitable clauses, wherein measuring the total system voltage and the temperature of the catalytic oxidizer is performed together, at the same time, within a limited amount of time, or simultaneously.

46. The method of clause 42, any other suitable clause, or any combination of suitable clauses, wherein detecting the increase in the total system voltage and the increase in the temperature of the catalytic oxidizer indicates a change in fuel cell composition.

47. The method of clause 46, any other suitable clause, or any combination of suitable clauses, wherein detecting the increase in the total system voltage and the increase in the temperature of the catalytic oxidizer while other system parameters remain constant indicates a change in fuel cell composition.

48. The method of clause 47, any other suitable clause, or any combination of suitable clauses, wherein the other system parameters that remain constant comprise the current, the temperature, or the pressure of the fuel cell system.

49. The method of clause 42, any other suitable clause, or any combination of suitable clauses, wherein detecting the increase in the temperature of the catalytic oxidizer while the total system voltage is constant or decreased does not indicate a change in fuel cell composition.

50. The method of clause 1, any other suitable clause, or any combination of suitable clauses, wherein the method is performed by a device.

51. The method of clause 50, any other suitable clause, or any combination of suitable clauses, wherein the device is a control device.

52. The method of clause 51, any other suitable clause, or any combination of suitable clauses, wherein the control device regulates the fuel flow or the air flow of the fuel cell system.

53. The method of clause 20, any other suitable clause, or any combination of suitable clauses, wherein the flow comprises an air flow, a fuel flow, or an exhaust flow.

54. The method of clause 20, any other suitable clause, or any combination of suitable clauses, wherein measuring the fuel cell system parameters in the flow path comprises measuring the fuel flow, a fuel utilization, a fuel flow rate, a temperature, or a current availability in a fuel flow path.

55. The method of clause 54, any other suitable clause, or any combination of suitable clauses, wherein measuring the fuel flow, a fuel utilization, a fuel flow rate, a temperature, or a current availability in the fuel flow path comprises detecting an increase in the fuel flow, the fuel utilization, the fuel flow rate, the temperature, or the current availability in the fuel flow path.

56. The method of clause 55, any other suitable clause, or any combination of suitable clauses, wherein detecting an increase in current availability and an increase in fuel efficiency while the fuel utilization and the fuel burn capacity remain constant indicates a change in fuel cell composition.

57. The method of clause 54, any other suitable clause, or any combination of suitable clauses, wherein measuring parameters of the fuel flow path further comprises measuring fuel composition at a fuel reformer inlet or a fuel reformer outlet.

58. The method of clause 20, any other suitable clause, or any combination of suitable clauses, wherein the method further comprises measuring the fuel cell system parameters selected from the group consisting of measuring ethane composition, an inlet or outlet of a catalytic oxidizer, a total system voltage, a change in mass flow rate or pressure across system heat exchangers, and dilution air individually or in combination.

59. The method of clause 1, any other suitable clause, or any combination of suitable clauses, wherein mathematically analyzing the measurements of the fuel cell system parameters is performed by a computer algorithm of a control device.

60. A method for compensating for variations in a fuel composition of a fuel cell power system, comprising:
measuring the fuel cell system parameters,
mathematically analyzing the measurements of the fuel cell system parameters,
identifying a difference in the fuel composition of the fuel cell power system, and
generating and transmitting a command or instruction from a control device to the components of the fuel cell power system.

61. A fuel cell power system for identifying and compensating for variations identified in a fuel composition of a fuel cell power system, comprising:
the fuel cell system components selected from the group consisting of a catalytic oxidizer, a reformer, an exhaust, a fuel cell stack or system, or a combination thereof, and
a control device configured to control the fuel cell system components, wherein the control device comprises a computer algorithm to indirectly correlate measurements of the fuel cell system components to a difference in the fuel composition.

62. The fuel cell power system of clause 61, any other suitable clause, or any combination of suitable clauses, wherein the measurements of the fuel cell system components are a system voltage and a temperature of a catalytic oxidizer.

63. The fuel cell power system of clause 61, any other suitable clause, or any combination of suitable clauses, wherein the measurements of the fuel cell system components are a system voltage and a temperature of a reformer.

64. The fuel cell power system of clause 61, any other suitable clause, or any combination of suitable clauses, wherein the measurements of the fuel cell system components are a system voltage and a temperature of an exhaust air.

65. The fuel cell power system of clause 61, any other suitable clause, or any combination of suitable clauses, wherein the control device is configured to make the measurements of the fuel cell system components.

66. The fuel cell power system of clause 61, any other suitable clause, or any combination of suitable clauses, wherein the computer algorithm of the control device analyzes the measurements of the fuel cell system components to indirectly correlate measurements of the fuel cell system components to a difference in the fuel composition.

67. A method for a fuel cell power system to identify and compensate for fuel composition variations.

68. The method of clause 67, any other suitable clause, or any combination of suitable clauses, wherein the fuel cell power system comprises the fuel cell systems.

69. The method of clause 68, any other suitable clause, or any combination of suitable clauses, wherein the fuel cell system comprises fuel.

70. The method of clause 69, any other suitable clause, or any combination of suitable clauses, wherein the fuel comprises less than 100% methane 71. The method of clause 69, any other suitable clause, or any combination of suitable clauses, wherein the fuel comprises about 80-85% methane.

72. The method of clause 69, any other suitable clause, or any combination of suitable clauses, wherein the fuel comprises about 15% ethane.

73. The method of clause 69, any other suitable clause, or any combination of suitable clauses, wherein the fuel comprises about 15% ethane and no fuel compensation.

74. The method of clause 69, any other suitable clause, or any combination of suitable clauses, wherein the fuel comprises about 15% ethane with fueling compensation.

75. The method of clause 68, any other suitable clause, or any combination of suitable clauses, wherein the fuel cell systems comprise the fuel cells.

76. The method of clause 75, any other suitable clause, or any combination of suitable clauses, wherein the fuel cells of the fuel cell power system comprises a phosphoric acid fuel cell (PAFC).

77. The method of clause 75, any other suitable clause, or any combination of suitable clauses, wherein the fuel cells of the fuel cell power system comprises a molten carbonate fuel cell (MCFC).

78. The method of clause 75, any other suitable clause, or any combination of suitable clauses, wherein the fuel cells of the fuel cell power system comprises a proton exchange membrane.

79. The method of clause 75, any other suitable clause, or any combination of suitable clauses, wherein the fuel cells of the fuel cell power system comprises a polymer exchange membrane fuel cell (PEMFC).

80. The method of clause 75, any other suitable clause, or any combination of suitable clauses, wherein the fuel cells of the fuel cell power system comprises a solid oxide fuel cell (SOFC).

81. The method of clause 75, any other suitable clause, or any combination of suitable clauses, wherein the fuel cells of the fuel cell power system comprises the solid oxide fuel cells (SOFC).

82. The method of clause 75, any other suitable clause, or any combination of suitable clauses, wherein the fuel cells of the fuel cell power system comprises a plurality of solid oxide fuel cells (SOFC).

83. The method of clause 68, any other suitable clause, or any combination of suitable clauses, wherein the fuel cell system comprises utilizing fuel cell system and process property measurements.

84. The method of clause 68, any other suitable clause, or any combination of suitable clauses, wherein the fuel cell system comprises measuring parameters in order to identify or determine whether a fuel composition variation has occurred.

85. The method of clause 84, any other suitable clause, or any combination of suitable clauses, wherein the parameters are measured individually.

86. The method of clause 84, any other suitable clause, or any combination of suitable clauses, wherein the parameters are measured in combination.

87. The method of clause 84, any other suitable clause, or any combination of suitable clauses, wherein the parameters comprise flow.

88. The method of clause 87, any other suitable clause, or any combination of suitable clauses, wherein the flow comprises wherein flow comprises air.

89. The method of clause 87, any other suitable clause, or any combination of suitable clauses, wherein the flow comprises fuel.

90. The method of clause 87, any other suitable clause, or any combination of suitable clauses, wherein the flow comprises exhaust flow.

91. The method of clause 84, any other suitable clause, or any combination of suitable clauses, wherein the parameters comprise voltage.

92. The method of clause 91, any other suitable clause, or any combination of suitable clauses, wherein the voltage is measured at any system component generating power from the system.

93. The method of clause 91, any other suitable clause, or any combination of suitable clauses, wherein the voltage is measured at the fuel cell stack.

94. The method of clause 91, any other suitable clause, or any combination of suitable clauses, wherein the voltage is measured at an inverter.

95. The method of clause 91, any other suitable clause, or any combination of suitable clauses, wherein the voltage is calculated by the power provided by a single fuel cell multiplied by the number of fuel cells in the fuel cell stack.

96. The method of clause 91, any other suitable clause, or any combination of suitable clauses, wherein the voltage is measured by any methods, techniques, or equipment known in the art.

97. The method of clause 91, any other suitable clause, or any combination of suitable clauses, wherein an increase in the system voltage in combination with an increase measured exhaust air temperature indicates that a difference in fuel cell composition has occurred.

98. The method of clause 91, any other suitable clause, or any combination of suitable clauses, wherein an increase in the system voltage in combination with an increase in the reformer temperature indicates that a difference in fuel cell composition has occurred.

99. The method of clause 91, any other suitable clause, or any combination of suitable clauses, wherein an increase in the system voltage in combination with an increase in the Catox outlet temperature while all other system parameters remain constant indicates that a difference in fuel cell composition has occurred.

100. The method of clause 91, any other suitable clause, or any combination of suitable clauses, wherein an increase in the system voltage in combination with an increase in the Catox outlet temperature while the system current remains the same indicates that significantly heavy or heavier hydrocarbons than were expected to be present in the fuel or fuel composition have been detected or identified in the air flow.

101. The method of clause 91, any other suitable clause, or any combination of suitable clauses, wherein an increase in one, two, three or all four of the following fuel cell power system parameters indicates a difference in a fuel composition: (1) the outlet temperature of the catalytic oxidizer (2) the temperature of the reformer (3) the exhaust air temperature of the system or (4) the total system voltage.

102. The method of clause 84, any other suitable clause, or any combination of suitable clauses, wherein the parameters comprise pressure.

103. The method of clause 84, any other suitable clause, or any combination of suitable clauses, wherein the parameters comprise current.

104. The method of clause 84, any other suitable clause, or any combination of suitable clauses, wherein the parameters comprise heat or heat balance.

105. The method of clause 84, any other suitable clause, or any combination of suitable clauses, wherein the parameters comprise fuel utilization.

106. The method of clause 84, any other suitable clause, or any combination of suitable clauses, wherein the parameters comprise fuel burn capacity.

107. The method of clause 84, any other suitable clause, or any combination of suitable clauses, wherein the parameters comprise operating parameters.

108. The method of clause 84, any other suitable clause, or any combination of suitable clauses, wherein the parameters comprise other metrics or algorithms.

109. The method of clause 84, any other suitable clause, or any combination of suitable clauses, wherein the parameters comprise temperature.

110. The method of clause 109, any other suitable clause, or any combination of suitable clauses, wherein the temperature comprises any fuel cell power system temperature.

111. The method of clause 109, any other suitable clause, or any combination of suitable clauses, wherein the temperature comprises any fuel cell system temperature occurring in the air flow path only 112. The method of clause 109, any other suitable clause, or any combination of suitable clauses, wherein the temperature comprises any fuel cell system temperature in the fuel flow path only.

113. The method of clause 109, any other suitable clause, or any combination of suitable clauses, wherein the temperature comprises a combination of measurements from both the air flow path and the fuel flow path.

114. The method of clause 113, any other suitable clause, or any combination of suitable clauses, wherein the temperature comprises the outlet temperature of the catalytic oxidizer.

115. The method of clause 113, any other suitable clause, or any combination of suitable clauses, wherein the temperature comprises the temperature of the reformer.

116. The method of clause 113, any other suitable clause, or any combination of suitable clauses, wherein the temperature comprises the exhaust air temperature.

117. The method of clause 113, any other suitable clause, or any combination of suitable clauses, wherein the temperature comprises the temperature of the catalytic oxidizer, the temperature of the reformer, and the temperature of the system, individually, together, or in combination.

118. The method of clause 109, any other suitable clause, or any combination of suitable clauses, wherein the temperature comprises any fuel cell system temperature in the air flow path occurring after the Burner/Catox.

119. The method of clause 109, any other suitable clause, or any combination of suitable clauses, wherein the temperature comprises any fuel cell system temperature that comprises the Burner/Catox outlet temperature of the system.

120. The method of clause 109, any other suitable clause, or any combination of suitable clauses, wherein the temperature comprises any fuel cell system temperature that comprises the exhaust air temperature of the system.

121. The method of clause 109, any other suitable clause, or any combination of suitable clauses, wherein the temperature comprises the temperature across any heat exchanger in the air flow path.

122. The method of clause 121, any other suitable clause, or any combination of suitable clauses, wherein the temperature of the air to air heat exchanger is measured to determine whether a fuel composition variation has occurred in the system.

123. The method of clause 109, any other suitable clause, or any combination of suitable clauses, wherein dilution air in the fuel cell power system may also be used to control temperature.

124. The method of clause 84, any other suitable clause, or any combination of suitable clauses, wherein the determining whether a fuel composition variation has occurred is comprised by measuring the change in energy ($\Delta Q$) by measuring the Q of the exhaust stream of the air side heat exchangers.

125. The method of clause 124, any other suitable clause, or any combination of suitable clauses, wherein the wherein the exhaust across the AAHT is able to be assessed and calibrated.

126. The method of clause 84, any other suitable clause, or any combination of suitable clauses, wherein the determining whether a fuel composition variation has occurred.

127. The method of clause 126, any other suitable clause, or any combination of suitable clauses, wherein determining a fuel composition variation comprises measuring a system parameter.

128. The method of clause 126, any other suitable clause, or any combination of suitable clauses, wherein determining a fuel composition variation comprises electronic system control devices.

129. The method of clause 128, any other suitable clause, or any combination of suitable clauses, wherein the electronic system control device is physically attached to the fuel cell power systems or components.

130. The method of clause 128, any other suitable clause, or any combination of suitable clauses, wherein the electronic system control device is physically detached from the fuel cell power systems or components.

131. The method of clause 128, any other suitable clause, or any combination of suitable clauses, wherein the electronic system control device is configured to directly command and control the operation of associated fuel cell systems and components.

132. The method of clause 128, any other suitable clause, or any combination of suitable clauses, wherein the electronic system control device is configured to electronically command and control the operation of associated fuel cell systems and components.

133. The method of clause 128, any other suitable clause, or any combination of suitable clauses, wherein the electronic system control device is configured to virtually command and control the operation of associated fuel cell systems and components.

134. The method of clause 128, any other suitable clause, or any combination of suitable clauses, wherein the electronic system control device is configured to remotely command and control the operation of associated fuel cell systems and components.

135. The method of clause 1282, any other suitable clause, or any combination of suitable clauses, wherein the electronic system control device is configured to directly command and control the operation of associated fuel cell systems and components.

136. The method of clause 128, any other suitable clause, or any combination of suitable clauses, wherein the electronic system control device is internal to the fuel cell power systems or components.

137. The method of clause 128, any other suitable clause, or any combination of suitable clauses, wherein the electronic system control device is external to the fuel cell power systems or components.

138. The method of clause 128, any other suitable clause, or any combination of suitable clauses, wherein the electronic system control device comprises logic.

139. The method of clause 128, any other suitable clause, or any combination of suitable clauses, wherein the logic is a computer algorithm or a mathematical algorithm.

140. The method of clause 128, any other suitable clause, or any combination of suitable clauses, wherein the electronic system control device manually transmits a command to a human user that may manually transmits that information directly into control devices physically located on the fuel cell system.

141. The method of clause 128, any other suitable clause, or any combination of suitable clauses, wherein the electronic system control device is in any vicinity to the actual fuel cell system that it controls.

142. The method of clause 128, any other suitable clause, or any combination of suitable clauses, wherein the electronic system control device is in no physical vicinity to the actual fuel cell system that it controls.

143. The method of clause 128, any other suitable clause, or any combination of suitable clauses, wherein the electronic system control device transmits an automatic or electronic command signal to the air to air catalytic oxidizer (Catox).

144. The method of clause 128, any other suitable clause, or any combination of suitable clauses, wherein the electronic system control device transmits an automatic or electronic command signal to the reformer (REF).

145. The method of clause 128, any other suitable clause, or any combination of suitable clauses, wherein the electronic system control device transmits an automatic or electronic command signal to the air to air heat exchanger (AAHT).

146. The method of clause 1282, any other suitable clause, or any combination of suitable clauses, wherein the electronic system control device transmits an automatic or electronic command signal to the anode gas recirculation (AGR) blower.

147. The method of clause 67, any other suitable clause, or any combination of suitable clauses, wherein the fuel cell power system comprises the fuel cell stacks.

148. The method of clause 147, any other suitable clause, or any combination of suitable clauses, wherein the fuel cell stacks comprise the fuel cells.

149. The method of clause 67, any other suitable clause, or any combination of suitable clauses, wherein the fuel cell power system comprises balance of plant (BOP) systems or components.

150. The method of clause 149, any other suitable clause, or any combination of suitable clauses, wherein the BOP systems or components comprise a reformer (REF).

151. The method of clause 150, any other suitable clause, or any combination of suitable clauses, wherein the reformer comprises an ethane reformer (C2REF).

152. The method of clause 150, any other suitable clause, or any combination of suitable clauses, wherein the reformer is assessed for fuel composition variation identification.

153. The method of clause 149, any other suitable clause, or any combination of suitable clauses, wherein the BOP systems or components comprise a compressor (COMP).

154. The method of clause 149, any other suitable clause, or any combination of suitable clauses, wherein the BOP systems or components comprise a burner.

155. The method of clause 149, any other suitable clause, or any combination of suitable clauses, wherein the BOP systems or components comprise a catalytic oxidizer (Burner/Catox).

156. The method of clause 149, any other suitable clause, or any combination of suitable clauses, wherein the BOP systems or components comprise a combination thereof (Burner/Catox).

157. The method of clause 149, any other suitable clause, or any combination of suitable clauses, wherein the BOP systems or components comprise a blower.

158. The method of clause 157 any other suitable clause, or any combination of suitable clauses, wherein the blower comprises an added gas recycle (AGR) blower.

159. The method of clause 149, any other suitable clause, or any combination of suitable clauses, wherein the BOP systems or components comprise an inverter.

160. The method of clause 149, any other suitable clause, or any combination of suitable clauses, wherein the BOP systems or components comprise a motor.

161. The method of clause 149, any other suitable clause, or any combination of suitable clauses, wherein the BOP systems or components comprise a valve.

162. The method of clause 161, any other suitable clause, or any combination of suitable clauses, wherein the valve comprises an intake.

163. The method of clause 161, any other suitable clause, or any combination of suitable clauses, wherein the valve comprises a bypass.

164. The method of clause 161, any other suitable clause, or any combination of suitable clauses, wherein the valve comprises an exhaust.

165. The method of clause 161, any other suitable clause, or any combination of suitable clauses, wherein the valve comprises a wastegate valve.

166. The method of clause 149, any other suitable clause, or any combination of suitable clauses, wherein the BOP systems or components comprise a heat exchanger.

167. The method of clause 161, any other suitable clause, or any combination of suitable clauses, wherein the heat exchanger comprises any type of heat exchanger sufficient for its standard purpose of exchanging heat from one fluid to another.

168. The method of clause 161, any other suitable clause, or any combination of suitable clauses, wherein the heat exchanger comprises an air to air high temperature heat exchanger (AAHT).

169. The method of clause 161, any other suitable clause, or any combination of suitable clauses, wherein the heat exchanger comprises an air to air low temperature heat exchanger (AALT).

170. The method of clause 161, any other suitable clause, or any combination of suitable clauses, wherein the heat exchanger comprises a fuel cooler heat exchanger (FCLR).

171. The method of clause 161, any other suitable clause, or any combination of suitable clauses, wherein the heat exchanger comprises a fuel to fuel low temperature heat exchanger (FFLT).

172. The method of clause 161, any other suitable clause, or any combination of suitable clauses, wherein the heat exchanger comprises a fuel to fuel high temperature heat exchanger (FFHT).

173. The method of clause 161, any other suitable clause, or any combination of suitable clauses, wherein the heat exchanger comprises a radiation heat exchanger (RADHX).

174. The method of clause 149, any other suitable clause, or any combination of suitable clauses, wherein the BOP systems or components comprise a humidifier.

175. The method of clause 149, any other suitable clause, or any combination of suitable clauses, wherein the BOP systems or components comprise a fuel cell.

176. The method of clause 149, any other suitable clause, or any combination of suitable clauses, wherein the BOP systems or components comprise a fuel cell stack.

177. The method of clause 149, any other suitable clause, or any combination of suitable clauses, wherein the BOP systems or components comprise an intake.

178. The method of clause 149, any other suitable clause, or any combination of suitable clauses, wherein the BOP systems or components comprise a turbine.

179. The method of clause 149, any other suitable clause, or any combination of suitable clauses, wherein the BOP systems or components comprise an exhaust.

180. The method of clause 149, any other suitable clause, or any combination of suitable clauses, wherein the BOP systems or components comprise an intercooler.

181. The method of clause 149, any other suitable clause, or any combination of suitable clauses, wherein the BOP systems or components are coupled together.

182. The method of clause 181, any other suitable clause, or any combination of suitable clauses, wherein coupling together the BOP systems or components is in series so as to form a sealed and/or air-tight system for effectively handling fluid.

183. The method of clause 181, any other suitable clause, or any combination of suitable clauses, wherein the fluid comprises air.

184. The method of clause 181, any other suitable clause, or any combination of suitable clauses, wherein the fluid comprises fuel.

185. The method of clause 181, any other suitable clause, or any combination of suitable clauses, wherein the fluid comprises water.

186. The method of clause 181, any other suitable clause, or any combination of suitable clauses, wherein the fluid is flowed from one component at the beginning of the series to and through intermediate components.

187. The method of clause 186, any other suitable clause, or any combination of suitable clauses, wherein the intermediate components comprise a compressor.

188. The method of clause 186, any other suitable clause, or any combination of suitable clauses, wherein the intermediate components comprise a heat exchanger.

189. The method of clause 186, any other suitable clause, or any combination of suitable clauses, wherein the intermediate components comprise a fuel cell stack.

190. The method of clause 181, any other suitable clause, or any combination of suitable clauses, wherein the fluid continues from the beginning components to and through intermediate components and to and through final components at the end of the system.

191. The method of clause 67, any other suitable clause, or any combination of suitable clauses, wherein the fuel cell power system comprises an air flow path.

192. The method of clause 191, any other suitable clause, or any combination of suitable clauses, wherein the air flow path comprises the of the compressor (COMP).

193. The method of clause 191, any other suitable clause, or any combination of suitable clauses, wherein the air flow path comprises the air to air high temperature heat exchanger (AAHT).

194. The method of clause 191, any other suitable clause, or any combination of suitable clauses, wherein the air flow path comprises the solid oxide fuel cell stack (SOFC Stack).

195. The method of clause 191, any other suitable clause, or any combination of suitable clauses, wherein the air flow path comprises the solid oxide fuel cell stack (SOFC) Stack, the burner and/or catalytic oxidizer (Burner/Catox), and the air to air low temperature heat exchanger (AALT).

196. The method of clause 67, any other suitable clause, or any combination of suitable clauses, wherein the fuel cell power system comprises a fuel flow path.

197. The method of clause 196, any other suitable clause, or any combination of suitable clauses, wherein the fuel flow path comprises the reformer (REF and C2REF).

198. The method of clause 196, any other suitable clause, or any combination of suitable clauses, wherein the fuel flow path comprises the fuel to fuel high temperature heat exchanger (FFHT).

199. The method of clause 196, any other suitable clause, or any combination of suitable clauses, wherein the fuel flow path comprises the solid oxide fuel cell stack (SOFC Stack).

200. The method of clause 196, any other suitable clause, or any combination of suitable clauses, wherein the fuel flow path comprises a fuel cooler heat exchanger (FCLR).

201. The method of clause 196, any other suitable clause, or any combination of suitable clauses, wherein the fuel flow path comprises the burner or catalytic oxidizer (Burner/Catox).

202. The method of clause 196, any other suitable clause, or any combination of suitable clauses, wherein the fuel flow path comprises the anode gas recycle (AGR) blower.

203. The method of clause 196, any other suitable clause, or any combination of suitable clauses, wherein the fuel flow path comprises the fuel to fuel low temperature heat exchanger (FFLT).

204. The method of clause 67, any other suitable clause, or any combination of suitable clauses, wherein the fuel cell power system comprises a device to regulate the fuel flow to reduce, stop, or decrease the fuel flow provided to the fuel cell system.

205. The method of clause 67, any other suitable clause, or any combination of suitable clauses, wherein the fuel cell power system comprises compensation for identifying fuel composition differences.

206. The method of clause 205, any other suitable clause, or any combination of suitable clauses, wherein the compensation is generated by an electronic system.

207. The method of clause 205, any other suitable clause, or any combination of suitable clauses, wherein the compensation is generated automatically.

208. The method of clause 205, any other suitable clause, or any combination of suitable clauses, wherein the compensation is generated immediately.

209. The method of clause 205, any other suitable clause, or any combination of suitable clauses, wherein the compensation is generated in real-time.

210. The method of clause 67, any other suitable clause, or any combination of suitable clauses, wherein no water is used or injected into the fuel cell system.

211. The method of clause 67, any other suitable clause, or any combination of suitable clauses, wherein utilizing a control device comprising a mathematical, computer, or algorithmic logic.

212. The method of clause 211, any other suitable clause, or any combination of suitable clauses, wherein the algorithm is the calculation catox inlet or outlet temperature that rise individually or in combination.

213. The method of clause 211, any other suitable clause, or any combination of suitable clauses, wherein the algorithm is the calculation catox complete inlet and/or outlet conditions.

214. The method of clause 211, any other suitable clause, or any combination of suitable clauses, wherein the algorithm comprises anode off gas.

215. The method of clause 211, any other suitable clause, or any combination of suitable clauses, wherein the algorithm comprises cathode outlet air.

216. The method of clause 211, any other suitable clause, or any combination of suitable clauses, wherein the algorithm comprises catox dilution air.

217. The method of clause 211, any other suitable clause, or any combination of suitable clauses, wherein the algorithm comprises fuel cell stack voltage.

218. The method of clause 67, any other suitable clause, or any combination of suitable clauses, wherein an indirect mechanism to identify fuel compositions and variations in fuel compositions does not utilize large expensive equipment.

219. The method of clause 67, any other suitable clause, or any combination of suitable clauses, wherein a baseline fuel cell power system comprises multiple air side and fuel side components.

220. The method of clause 219, any other suitable clause, or any combination of suitable clauses, wherein the baseline fuel cell system comprises fuel that has a composition assumed or confirmed to comprise about 100% methane with no or extremely limited amounts of ethane.

221. The method of clause 219, any other suitable clause, or any combination of suitable clauses, wherein the baseline fuel cell system demonstrated that its net efficiency is about 45.17% and its net power is about 14.09 kW.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Specified numerical ranges of units, measurements, and/or values comprise, consist essentially or, or consist of all the numerical values, units, measurements, and/or ranges including or within those ranges and/or endpoints, whether those numerical values, units, measurements, and/or ranges are explicitly specified in the present disclosure or not.

Unless defined otherwise, technical and scientific terms used herein have the same meaning as is commonly understood by one of ordinary skill in the art to which this disclosure belongs. The terms "first," "second," "third" and the like, as used herein do not denote any order or importance, but rather are used to distinguish one element from another. The term "or" is meant to be inclusive and mean either or all of the listed items. In addition, the terms "connected" and "coupled" are not restricted to physical or mechanical connections or couplings, and can include electrical connections or couplings, whether direct or indirect.

Moreover, unless explicitly stated to the contrary, embodiments "comprising," "including," or "having" an element or a plurality of elements having a particular property may include additional such elements not having that property. The term "comprising" or "comprises" refers to a composition, compound, formulation, or method that is inclusive and does not exclude additional elements, components, and/or method steps. The term "comprising" also refers to a composition, compound, formulation, or method embodiment of the present disclosure that is inclusive and does not exclude additional elements, components, or method steps.

The phrase "consisting of" or "consists of" refers to a compound, composition, formulation, or method that excludes the presence of any additional elements, components, or method steps. The term "consisting of" also refers to a compound, composition, formulation, or method of the present disclosure that excludes the presence of any additional elements, components, or method steps.

The phrase "consisting essentially of" or "consists essentially of" refers to a composition, compound, formulation, or method that is inclusive of additional elements, components, or method steps that do not materially affect the characteristic(s) of the composition, compound, formulation, or method. The phrase "consisting essentially of" also refers to a composition, compound, formulation, or method of the present disclosure that is inclusive of additional elements, components, or method steps that do not materially affect the characteristic(s) of the composition, compound, formulation, or method steps.

It is to be understood that the above description is intended to be illustrative, and not restrictive. For example, the above-described embodiments (and/or aspects thereof) is used individually, together, or in combination with each other. In addition, many modifications is made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A fuel cell system comprising:
a fuel cell stack;
components selected from the group consisting of a catalytic oxidizer, a reformer, and an exhaust system;
sensors configured to measure parameters associated with the components, at least one of the parameters comprising a system voltage of the fuel cell system; and
a control device comprising a microprocessor configured to:
identify at least one variation in a fuel composition of the fuel cell system based, at least in part, on a detected change in the system voltage of the measured parameters, and
control the components to compensate for the at least one variation using a computer algorithm in response to the identified at least one variation indicating a threshold difference in the fuel composition.

2. The fuel cell system of claim 1, wherein the components includes the catalytic oxidizer, the sensors includes a voltage sensor and a temperature sensor, wherein the voltage sensor is configured to measure a system voltage and the temperature sensor is configured to measure a temperature of the catalytic oxidizer.

3. The fuel cell system of claim 1, wherein the measured parameters associated with the components are a system voltage and a temperature of a reformer.

4. The fuel cell system of claim 1, wherein the measured parameters associated with the components are a system voltage and a temperature of an exhaust air.

5. The fuel cell system of claim 1, wherein the control device is configured to accept the measured parameters of the components.

6. The fuel cell system of claim 1, wherein the computer algorithm of the control device is configured to analyze each of the measured parameters of the components for correlation to differences in the fuel composition.

7. The fuel cell system of claim 1, wherein a current flowing through the components, the sensors and the microprocessor remains constant.

8. The fuel cell system of claim 1, wherein a current flowing through the components, the sensors and the microprocessor remains within an operational tolerance band.

9. The fuel cell system of claim 1, wherein the control device is to generate and transmit a command signal to control the components of the fuel cell system in response to the measured parameters associated with the components indicating a threshold difference in the fuel composition.

10. The fuel cell system of claim 9, wherein the control device is to mathematically analyze the measurements of the parameters associated with the components utilizing the computer algorithm.

* * * * *